United States Patent
McDonald

(10) Patent No.: US 11,744,227 B1
(45) Date of Patent: Sep. 5, 2023

(54) ANIMAL WATER DISPENSER APPARATUS AND PROCESS FOR PROVIDING FRESH WATER TO AN ANIMAL

(71) Applicant: Tim McDonald, Missouri City, TX (US)

(72) Inventor: Tim McDonald, Missouri City, TX (US)

( * ) Notice: Subject to any disclaimer, the term of this patent is extended or adjusted under 35 U.S.C. 154(b) by 0 days.

(21) Appl. No.: 16/658,846

(22) Filed: Oct. 21, 2019

Related U.S. Application Data

(63) Continuation-in-part of application No. 15/951,667, filed on Apr. 12, 2018, now Pat. No. 10,780,462, which is a continuation-in-part of application No. 15/409,058, filed on Jan. 18, 2017, now Pat. No. 11,089,789, which is a continuation-in-part of application No. 14/877,519, filed on Oct. 7, 2015, now Pat. No. 10,456,812, which is a continuation-in-part of application No. 14/812,545, filed on Jul. 29, 2015, now Pat. No. 9,408,412, which is a continuation-in-part of application No. 14/550,195, filed on Nov. 21, 2014, now Pat. No. 9,320,286.

(51) Int. Cl.
*A01K 7/02* (2006.01)

(52) U.S. Cl.
CPC ...................................... *A01K 7/02* (2013.01)

(58) Field of Classification Search
CPC ... A01K 7/02; A01K 7/027; A01K 7/00; A01K 7/04; A01K 1/035; A01K 45/002; A01K 5/0114; A01K 7/06
USPC ... 134/94.1; 119/72, 73, 74, 78, 75, 51.5, 81, 119/51.11, 69.5, 51.12
See application file for complete search history.

(56) References Cited

U.S. PATENT DOCUMENTS

| | | | | |
|---|---|---|---|---|
| 2,692,579 | A * | 10/1954 | Overby et al. | A01K 7/025 119/73 |
| 3,437,075 | A * | 4/1969 | Hawes, Jr. et al. | A01K 5/0216 119/57.2 |
| 3,820,508 | A * | 6/1974 | Robinson | A01K 7/027 119/73 |
| 4,248,176 | A * | 2/1981 | Kilstofte | A01K 7/02 119/72 |
| 4,394,847 | A * | 7/1983 | Langenegger et al. | A01K 7/02 137/414 |
| 4,469,049 | A * | 9/1984 | Waynick | A01K 7/06 119/76 |
| 4,628,867 | A * | 12/1986 | Brougham et al. | A01K 7/04 119/78 |
| 4,883,022 | A * | 11/1989 | Barker | A01K 7/027 119/73 |
| 4,986,221 | A * | 1/1991 | Shaw | A01K 7/027 4/623 |
| 5,036,800 | A * | 8/1991 | Lischka | A01K 7/06 119/75 |

(Continued)

*Primary Examiner* — David G Cormier
*Assistant Examiner* — Thomas Bucci
(74) *Attorney, Agent, or Firm* — Egbert, McDaniel & Swartz, PLLC

(57) ABSTRACT

An animal water dispenser apparatus has a container with an inlet opening and an outlet opening, and a water hose connected to the inlet opening. The inlet opening is positioned below the outlet opening. The water hose is adapted to pass fresh water into an interior of the container. The outlet opening is adapted to allow water from the interior of the container to be released outwardly of the container. A fresh water source can be connected to the water hose so as to pass fresh water under pressure through the water hose and into the interior of the container.

6 Claims, 3 Drawing Sheets

(56) References Cited

U.S. PATENT DOCUMENTS

| | | | |
|---|---|---|---|
| 5,474,029 A * | 12/1995 | Hofer | A01K 7/027 119/73 |
| 5,813,363 A * | 9/1998 | Snelling | A01K 7/027 119/73 |
| 6,119,628 A | 9/2000 | Lorenzana et al. | |
| 6,279,508 B1 * | 8/2001 | Marchant et al. | A01K 7/06 119/76 |
| 6,463,880 B1 * | 10/2002 | Callingham | A01K 7/04 119/73 |
| 6,866,005 B1 * | 3/2005 | Bunker | A01K 7/00 119/72 |
| 8,104,431 B2 | 1/2012 | Klenotiz | |
| 8,117,991 B1 | 2/2012 | Civitillo | |
| 8,251,300 B2 * | 8/2012 | Wilson | A01G 25/165 239/DIG. 15 |
| 8,651,056 B2 | 2/2014 | Gass et al. | |
| 8,978,587 B2 | 3/2015 | Vaccaro, II | |
| 9,320,286 B1 | 4/2016 | McDonald | |
| 10,264,762 B1 | 4/2019 | Lamb | |
| 2002/0162513 A1 * | 11/2002 | Winney | A01K 7/00 119/78 |
| 2005/0028750 A1 * | 2/2005 | Johnston | A01K 7/04 119/475 |
| 2006/0037547 A1 | 2/2006 | Flowers et al. | |
| 2006/0207515 A1 * | 9/2006 | Palett et al. | A01K 7/04 119/78 |
| 2006/0236948 A1 | 10/2006 | Wechsler | |
| 2007/0025037 A1 * | 2/2007 | Fitzgerald | A01K 7/00 361/78 |
| 2007/0029003 A1 * | 2/2007 | Reusche et al. | A01K 7/04 141/213 |
| 2008/0092965 A1 * | 4/2008 | Hymes | A01K 7/02 137/624.12 |
| 2009/0217881 A1 | 9/2009 | Chambers | |
| 2010/0175625 A1 * | 7/2010 | Klenotiz | A01K 7/06 119/74 |
| 2011/0180007 A1 * | 7/2011 | Mainini et al. | A01K 7/02 340/618 |
| 2012/0152374 A1 * | 6/2012 | Hymes | A01K 7/02 137/392 |
| 2013/0213308 A1 | 8/2013 | Koskey, Jr. | |
| 2015/0107522 A1 * | 4/2015 | Lamb | A01K 7/04 119/51.5 |
| 2015/0192933 A1 * | 7/2015 | Hymes | G05D 9/12 137/386 |
| 2015/0237826 A1 * | 8/2015 | Van Der Poel et al. | A01K 39/02 119/74 |
| 2015/0251894 A1 * | 9/2015 | Lake et al. | A01K 7/04 222/64 |
| 2017/0127650 A1 * | 5/2017 | Joline | A01K 7/022 |
| 2018/0177154 A1 * | 6/2018 | Etherton et al. | A01K 7/005 |
| 2019/0230945 A1 | 8/2019 | McDonald | |

* cited by examiner

ANIMAL WATER DISPENSER APPARATUS AND PROCESS FOR PROVIDING FRESH WATER TO AN ANIMAL

CROSS-REFERENCE TO RELATED APPLICATIONS

The present application is a continuation-in-part of U.S. Pat. Application Serial No. 15/951,667, filed on Apr. 12, 2018, and entitled "Washing Apparatus for Cleaning Game, Fruit, Vegetables, Fish or Crustacea in a Container", presently pending. U.S. Pat. Application Serial No. 15/951,667 is a continuation-in-part of U.S. Pat. Application Serial No. 15/409,058, filed on Jan. 18, 2017, and entitled "Apparatus for Cleaning Crustacea or Game", presently pending. U.S. Pat. Serial No. 15/409,058 is a continuation-in-part of U.S. Pat. Application Serial No. 14/877,519, filed on Oct. 7, 2015, and entitled "Apparatus and Method for Washing Meat and/or Produce", presently pending. U.S. Application Serial No. 14/877,519 is a continuation-in-part of U.S. Pat. Application Serial No. 14/812,545, filed on Jul. 29, 2015, and entitled "Apparatus and Method for Cleaning Produce". U.S. Pat. Application Serial No. 14/812,545 issued as U.S. Pat. No. 9,408,412 on Aug. 9, 2016. U.S. Application Serial No. 14/812,545 is a continuation-in-part of U.S. Application Serial No. 14/550,195, filed on Nov. 21, 2014. U.S. Pat. Application Serial No. 14/550,195 issued as U.S. Pat. No. 9,320,286 on Apr. 26, 2016 and was entitled "Apparatus and Method for Cleaning Game".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the provision of water to animals. More particularly, the present invention relates to continuously supplying fresh water to the animals.

2. Description of Related Art Including Information Disclosed Under 37 CFR 1.97 and 37 CFR 1.98.

Today, many households frequently have one or more pets, usually dogs and/or cats. Other households have horses and other animals as pets. One of the problems frequently encountered by pet owners is that there is not always someone at home at the necessary times to attend to the basic needs of the family pet, such as providing water. The pet owner may be away during portions of the day working, at school or attending to other matters. Frequently, the pet owner can make arrangements for the pet to be cared for by a friend, neighbor or other family member that will look in on the pet. The watering schedule for many pets can usually be arranged to be at convenient times for both the owner and the pet.

Although pets can be fed at certain times during the day, the same is not true for the pet's fluid needs. During the hot summers and other times during the year, the pet may need to receive water or other fluids on an "as needed" basis in order to maintain the pet's health. As a result, many owners rely on pet water dishes to provide the pet with water throughout the day. Many pet water dishes are merely a bowl that is placed on the floor other convenient location to provide the pet with fluids. A bowl may not be sufficient for larger pets or during hot weather or when the owner is not going to be present for an extended period of time. In these circumstances, there is a need for a bowl with a larger reservoir water. While it is possible to provide a larger bowl for the pet, larger bowls can be problematic. For example, a larger bowl is more difficult to transport from the filling area to the pet's drinking location. The greater amount of water presents an increased risk of spilling the water while the bowl is being moved. When the larger bowl is filled with water, it can be very heavy and difficult to carry.

Another problem with the large quantities of water occurs where more water is present then the pet can conveniently drink over a reasonable period of time. In those instances, the water can become contaminated with debris, thus rendering it unpalatable or even unhealthy. Particles of food and other items have a tendency to be dropped into the water by the pet, This soils the water and creates a breeding ground for bacteria and contagion. Another problem that occurs is that if the pet's dish is in a location that will be heated by the sun. The pet may not want to drink warm water. In certain locations, insect larvae can collect on the surface of the water. This can cause an eventual insect infestation and potential stinging injuries to the pet.

In addition to domestic pets, other animals are supplied with water by bowls that remain usually in place for days, and must periodically be cleaned and replenished. These animal can include zoo animals, animals housed in kennels, and many farm animals. In general, larger animals require larger containers, sometimes shaped more like a deep trough. As such, a need has developed so as to be able to supply water to animals which keeps the water container free of debris and which continuously replenishes the water with cool and fresh water throughout a period of time.

In the past, various patents and patent application publications have issued with respect to animal watering systems. For example, U.S. Pat. No. 6,119,628, issued on Sep. 19, 2002 Lorenzana et al., teaches an animal water dispensing apparatus that includes a molded plastic base member which has a reservoir support portion and a water receiving recess connected to receive water from a reservoir. A stainless steel liner for the recess is formed with small apertures to allow water to flow into the liner.

U.S. Pat. No. 8,104,431, issued on Jan. 31, 2012 to K. Klenotiz, shows a self-filling and self-training watering device. This apparatus has a first compartment containing a bowl that accepts fluid from an inlet opening. The fluid is continuously drained from the bowl. A second compartment, proximate to the bowl, houses a reservoir which temporarily retains continuously drained fluid. A pump is actuated by a float switch to discharge water from the reservoir. A sensor detects a movement so as to trigger a flow of fluid into the bowl.

U.S. Pat. No. 8,117,991, issued on Feb. 21, 2012 to S. Civitillo, discloses a pet water dispenser having a system of water pumps to circulate water, a water bowl containing a temperature sensor to determine the temperature of the water in the bowl, an ultraviolet light and a filter to purify and clean the circulating water, an in the-line water heater, and a thermoelectric cooling plate to keep the water at a desired temperature. Water jets inside the bowl spray water against the inside of the bowl to clean hair and debris from the bowl. A rotating drain disk in the bowl periodically opens to permit emptying of old water from the water bowl and closes to permit filling of the bowl with fresh water. A digital controller permits a pet owner to control the operation of the dispenser and the temperature of the water present in the bowl.

U.S. Pat. No. 8,651,056, issued on Feb. 18, 2014 to Gass et al., shows a pet bowl water cooling system that includes a bowl, a pump for removing water from the bowl, a heat transfer device, and a conduit adapted to carry the water to the heat transfer device. The heat transfer device can include a metal coil submerged in a relatively cool liquid medium. The bowl includes a float valve to allow water to flow into the bowl when the float valve is activated. A liquid medium includes water in a water reservoir of an evaporative cooler.

U.S. Pat. No. 8,978,587, issued on Mar. 17, 2015 to E. A. Vaccaro, discloses an automatic freshening water dispenser that has a bottom and is defined by a sidewall engaging the bottom and rising to a top edge. Three water inputs are positioned in the bowl. Two of the water inputs are positioned adjacent to the bottom of the bowl to eject water in a direction away from the recessed portion. A third water input is positioned in the sidewall at a location in the bowl opposing the recessed portion in order to eject water in a direction toward the recessed portion. A conduit couples the first, second and third water inputs to a water source connection.

U.S. Pat. No. 10,264,762, issued on Apr. 23, 2019 to A. P. Lamb, discloses an automatic self-cleaning and self-filling outdoor fluid feeding system for an animal. The system includes a sink, a fluid transport system, a housing supporting the sink and containing the fluid transport system, and a control assembly configured to control the automatic self-cleaning and self-filling operations of the system.

U.S. Pat. Application Publication No. 2006/0037547, published on Feb. 23, 2006 to Flowers et al., provides an animal water bowl assembly that is maintained clean by allowing the bowl to dry out after a use period. Two bowls are coordinated so that one is in use with water while the other is drying out. A two-faced assembly with oppositely facing bowls can automatically coordinate the steps for the two bowls. The water bowl assembly has at least two bowls. Filling with water occurs automatically by using water from a hydraulic source.

U.S. Pat. Application Publication No. 2006/0236948, published on Oct. 26, 2006 to L.I. Wechsler, provides a self-replenishing pet water bowl. This pet water bowl includes a trough defining a bowl portion and a feed-containing reservoir engageable in communication therewith. The reservoir can be selectively sealable such that the feed contents can be retained in the reservoir when inverted. There is an opening in a lower position. When installed during active feeding, the reservoir can be selectively opened to allow for a release of the contents to the trough of the bowl for consumption by the pet.

U.S. Pat. Application Publication No. 2009/0217881, published on Sep. 3, 2009 to M. Chambers, shows a pet water cooler which has a container or reservoir for holding a supply of water. The container is secured to a bowl or tray into which the reservoir will feed water. The reservoir usually has only a single opening or orifice for the water to be released into the bowl. This orifice is placed in the tray such that water flows out of the reservoir into the tray until an equilibrium is reached between the level of water in the tray and the remaining water in the reservoir. As the pet drinks water from the tray, additional water is released from the reservoir to refill the container until a new equilibrium is achieved. This continues until all of the water is removed from the reservoir and flows into the tray.

U.S. Pat. Application Publication No. 20130213308, published on Aug. 22, 2013 to J. D. Koskey, provides a pet drinking bowl designed to keep water fresh. This pet drinking bowl has a first housing section containing a drinking bowl and a pump section. A second housing section covers the pump section. There is an inlet and an outlet between the bowl section and the pump section. A filter is adjacent to the inlet. A pump with an exit is connected to the outlet. The device also includes a gravity feed water reservoir that has a conduit into the pump section.

The present inventor is the owner of U.S. Pat. No. 9,320,286, issued on Apr. 26, 2016. This patent describes an apparatus and method for cleaning game. In particular, this apparatus has a container with an interior volume defined by wall of the pipe position in the container adjacent to the wall. The pipe has at least one aperture suitable for directing a flow of water to a portion of the wall spaced from the pipe such of the flow of water creates a cyclonic path in the container. Ultimately, the pipe introduces water into the container such that as the water rises in the container, the water and associated debris in the water will reach the top of the container and spill thereover. As such, the pipe continuously provides clean water for the purposes of cleaning game. U.S. Pat. No. 9,408,412 shows a similar system adapted for the cleaning of produce.

The present inventor is also the inventor in U.S. Pat. Application Publication No. 2019/0230945, published on Aug. 1, 2019. This patent describes an apparatus with multiple nozzles for the cleaning of crustacea or game. This apparatus has a container with an interior defined by wall, a fluid inlet extending into the interior volume of the container, and a plurality of nozzles connected to the fluid inlet. The fluid inlet is adapted to pass a fluid under pressure into the interior volume of the container. Ultimately, as water rises within the container, the water will overflow the top of the container or exit through an outlet of the container so as to discharge dirt, debris and other contaminants from the interior of the container. The outlet of the container is positioned above the inlet so that as water is introduced into the bottom of the container, the water and the floating debris, will rise so as to eventually exit the container.

After experience with the manufacture and sale of products associated with the above-identified patents and patent applications of the present inventor, it was found that the system can be adapted so as to provide continuous clean and fresh water to pets. The system is also adaptable for continuously cleaning the container.

It is an object of the present invention to provide an animal water dispenser apparatus which continuously provides clean and fresh water to an animal.

It is another object of the present invention to provide an animal water dispenser apparatus that cleans dirt and debris from the interior of the container.

It is another object of the present invention to provide an animal water dispenser apparatus that provides a unlimited supply of water to the animal.

It is still another object of the present invention to provide an animal water dispenser apparatus which is easy-to-use, easy to manufacture and relatively inexpensive.

It is still another object of the present invention to provide an animal water dispenser apparatus which automatically removes insect larvae from the surface of the water and thereby prevents insect infestations.

It is still a further object of the present invention to provide an animal water dispensing apparatus which is difficult for the animal to overturn.

These and other objects and advantages of the present invention will become apparent from a reading of the attached specification and appended claims.

BRIEF SUMMARY OF THE INVENTION

The present invention is an animal water dispenser apparatus that comprises a container having an inlet opening and an outlet opening, and a water hose connected to the inlet opening. The inlet opening is positioned below the outlet opening. The water hose is adapted to pass fresh water into an interior of the container. The outlet opening is adapted to allow water from the interior of the container to be released outwardly of the container.

A fresh water source is connected to the water hose. The fresh water source is adapted to pass fresh water under pressure through the water hose. In particular, the fresh water source can be a faucet. The water hose is connected or interconnected to the faucet.

The inlet opening has a portion extending outwardly of an exterior of the container. This portion of the inlet opening has a connection for the water hose at an outer end thereof. In the preferred embodiment of the present invention, the inlet opening will be a passage through the wall of the container adjacent to the bottom of the container. In another embodiment of the present invention, a water hose can be draped over the upper edge of the container so that the inlet opening is positioned adjacent to the bottom of the container. Within the concept of the present invention, it is very important that the inlet opening be positioned adjacent to the bottom of the container one way or another. The inlet opening can also include a nozzle so as to release a pressurized spray of water. If the inlet opening has a nozzle, then this nozzle can also have multiple heads with sprayers.

Optionally, a timer can be affixed to the water hose in a location away from the container. This timer is adapted to pass fresh water from the fresh water source to the inlet of the container. The water hose, when used in association with a timer, can include a first water hose connected to the inlet opening and to the timer and a second water hose connected to the fresh water source and to the timer.

In the preferred embodiment the present invention, the container is a bucket. The bucket has a handle mounted to or at a top of the bucket. The handle is movable between an extended position in a retracted position. In alternative embodiments of the present invention, the container can be in the nature of a trough. The bucket can be of a stainless steel or plastic material. The trough can be in the nature of a metallic or concrete trough.

The outlet opening has a portion extending outwardly of the container adjacent to a top of the container. A drain hose is connected to this portion of the outlet opening. The drain hose is adapted to pass the water from the container toward a desired drain area. The outlet opening, in an alternative embodiment of the present invention, is simply the open top of the container. As such, water and debris will flow over the upper edge of the container into an area adjacent the exterior of the container.

The present invention is also a process for providing water to an animal. This process includes the steps of: (1) forming a container with an inlet opening and an outlet opening positioned above the inlet opening; (2) flowing water into the container for a period of time such that the water reaches the outlet opening; and (3) discharging water outwardly of the outlet opening when the water reaches the outlet opening. The process of the present invention further includes periodically passing water from a water source into the inlet opening so as to introduce freshwater into the container. The step of periodically passing water includes connecting a first water hose to the inlet opening, connecting an opposite end of the first water hose to a timer, connecting one end of a second water hose to the timer, connecting an opposite end of the second water hose to a water source, and opening the water source so that water flows under pressure to the timer. The timer releases water from the second water hose into the first water hose at a select period of time. This process further includes the step of draining the discharged water to a remote location away from the container.

Within the concept of the present invention, the container can be in the nature of a bowl, a bucket, a trough, or other container from which animals would drink water. Additionally, within the concept of the present invention, the inlet opening can include a nozzle positioned adjacent to the bottom of the container. The nozzle can take a variety of configurations. In one configuration, the nozzle can comprise a plurality of nozzles that are arranged in a vertical array so as to circulate water within the container. In other circumstances, the nozzle can include a plurality of nozzles that are directed in different directions within the container. In particular, one of the nozzles can be directed toward the top of the container while another of the nozzles is directed to the bottom of the container. Also, within the concept of the present invention, the outlet opening can actually be the top of the container. As such, as water continues to fill the bowl, eventually, the water and the debris will be discharged over the upper edge of the container.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
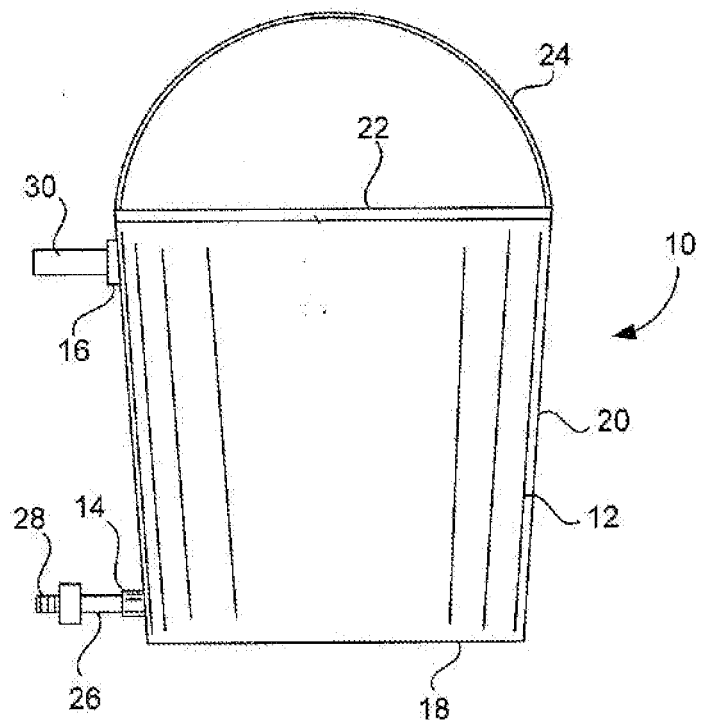
FIG. 1 is a side elevational view showing the animal water dispenser apparatus in accordance with the present invention.

Referring to FIG. 1, the animal water dispenser apparatus 10 is illustrated. The animal water dispenser apparatus 10 has a container 12 with an inlet opening 14 and an outlet opening 16. The inlet opening 14 is positioned below the outlet opening 16.

The container 12 is in the nature of a water bucket. The container 12 has a bottom 18 and a wall 20. The wall 20 tapers upwardly and outwardly from the bottom 18 so has as to have an open top 22. There is a lip that extends outwardly and downwardly from the top 22 of the container 12. The container 12 can be made of a polymeric material. A handle 24 is pivotally mounted at the top 22 of the container 12. In FIG. 1, the handle 24 is illustrated as in an extended position.

Figure 4:
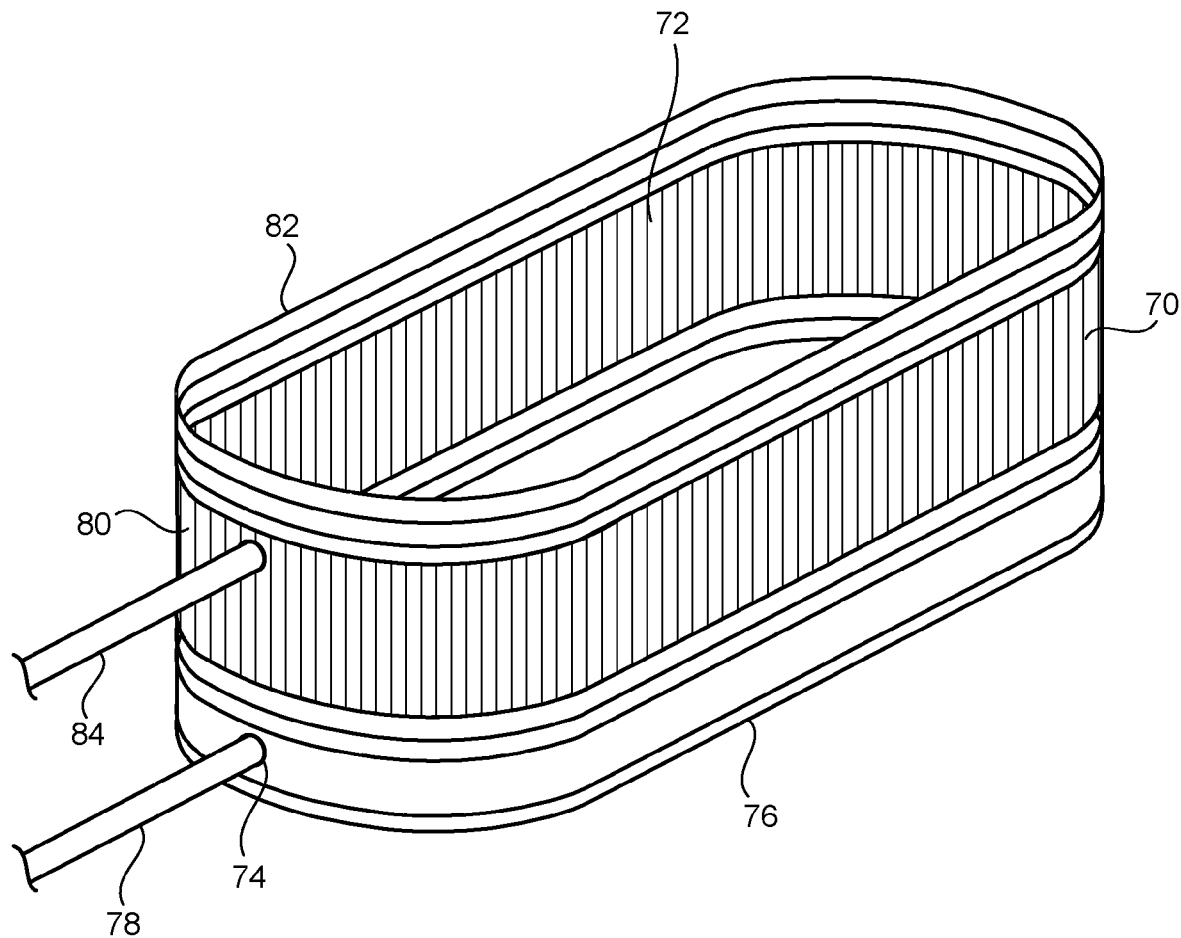
FIG. 4 is an upper perspective view showing the animal water dispenser apparatus of the present invention as used in conjunction with a trough.

The container 12 will contain a relatively large amount of water, such as a five gallon bucket. In other embodiments, the container can be in the nature of a trough (as shown in FIG. 4). The container 12 can be of any material. In particular, the bucket can be of a polymeric material or can be of a metallic and/or stainless steel material. In the circumstances where the container is in the nature of a trough, the trough can be formed of a concrete material or a metallic material.

When an animal desires to receive water from the container 12, the animal can simply reach over the top 22 of the container 12 in order to drink water. The container 12 is particularly useful in association with large pets, such as large dogs and horses. However, other animals will find it relatively easy to reach over the top 22 in order to receive water from the interior of the container 12.

The handle 24 can make the container 12 virtually spill-proof. Handle 24 can be draped over a fence post so as to fix the position of the container 12. In other circumstances, the handle 24 can be draped over another object so as to fix the position of the container 12.

The container 12 is continuously refreshed with clean and cool water. As such, inlet opening 14 is configured so as to introduce water into the interior of the container 12. The inlet opening 14 has a portion 26 that extends outwardly of an exterior of the container 12. This portion 26 has a connection 28 suitable for connection to a water hose. As such, water hose can be joined to the connection 26 so as to deliver water under pressure into the interior of the container 12. The inlet opening 14 can also include a nozzle positioned within the interior of the container 12. The nozzle can be connected to the inlet opening in order to deliver the water from the inlet opening into the interior of the container under pressure or in a desired direction. In one embodiment of the present invention, the nozzle can be in the nature of a vertical array of nozzles that are designed so as to deliver water in a cyclonic manner within the interior of the container. In other embodiments, the inlet opening can include a plurality of nozzles positioned within the container 12. The plurality of nozzles can be directed in different directions so that a flow of water under pressure is delivered toward the bottom of the container (so as to stir up debris at the bottom of the container) and another nozzle can be directed toward the top of the container so as to lift the stirred debris from the bottom of the container upwardly toward the top of the container and toward the outlet opening 16. Still further, the inlet opening 14 can include a nozzle that emits a fan-style spray of water in a direction to another portion of the inner wall of the container 12 away from the inlet opening 14. In another embodiment of the present invention, the inlet opening can be in the nature of a nozzle that is draped over the upper edge of the container such that the outlet of the hose is adjacent to the bottom of the container. Alternatively, a fixture can be applied to the side of the container so that the inlet opening is located within the container without penetrating the wall of the container.

Eventually, as water fills the container, it will eventually reach a level to that of the outlet opening 16. The outlet opening 16 has a portion 30 that extends outwardly of the exterior of the container 12. As such, when water reaches the level of the outlet opening 16, water will flow outwardly of the container 12 through portion 30. Ultimately portion 30 can be connected to a drain hose so as to allow water from the interior of the container 12 to be drained to a remote location away from the bucket 12. The outlet opening can also be in the the top of the container 12. As such, as water reaches the top of the container 12, water and debris will flow outwardly over the lip at the upper edge of the container. As such, water will spill to areas exterior of and adjacent to the container. In other circumstances, a drain pan can be placed below the container so as to collect any water and debris which has flowed over the upper edge of the container.

Figure 2:
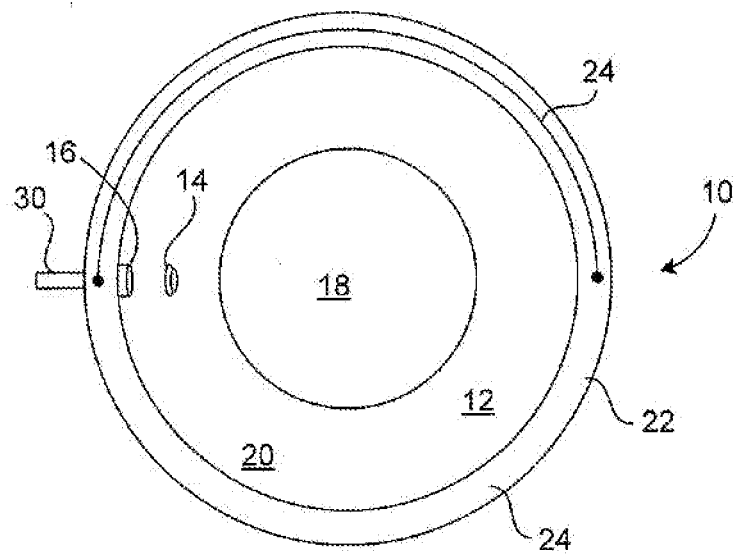
FIG. 2 is a plan view of the animal water dispenser apparatus of the present invention.

FIG. 2 shows the top of the animal water dispenser apparatus 10 of the present invention. As can be seen, the container 12 has a bottom 18, a wall 20 and a top 22. Handle 24 is pivotally mounted to the top 22. FIG. 2 shows the handle 24 in its retracted position. The inlet opening 14 is located adjacent to the bottom 18 of the container 12. The outlet opening 16 is located adjacent to the top of the container 12. The outlet opening 16 is shown as having portion 30 extending outwardly of the exterior of the container 12.

The handle 24 can be moved to the retracted position overlying the lip of container 12. This allows easier access by animals to the water on the inside of the container 12. It will be appreciated that the present invention avoids potential spillage. Initially, the container 12 can be transported to a desired location by using the handle 24 in its extended position. Once the container 12 reaches its intended destination, the handle 24 can be lowered. It is not necessary to carry water from the water source to a remote location (thus creating potential spillage). After the empty container 12 reaches its intended destination, a water source can be actuated so that water will flow through the inlet opening 14 and fill the container 12. It is not necessary to move the container to any other location, unless desired. Also, it will be appreciated that the container 12 has a relatively light weight not filled with water. As such, even children can move the container to a desired location since the container is not filled with water when initially deployed. The container only becomes have a once water is introduced into the interior of the container. The now-heavy weight of the container (when filled with water) will provide stability to the container throughout water consumption by the animal. In the present invention, the interior of the container 12 is always filled with water, consumption of the water by the animal will not reduce the weight of the filled container such that the filled container always provides stability when the animal drinks the water.

Figure 3:
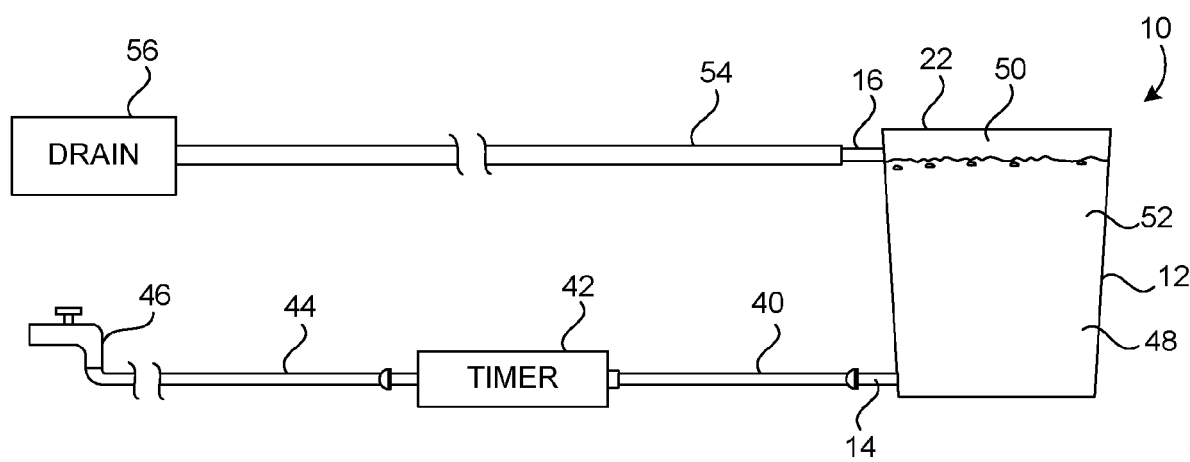
FIG. 3 is a diagrammatic illustration of the process of the present invention and the system employing the animal water dispenser apparatus of the present invention.

FIG. 3 shows the animal water dispenser apparatus 10 as used in a water system. Initially, it can be seen that the water inlet 14 is connected to one end of a first hose 40. An opposite end of the first hose 40 is connected to a timer 42. A second hose 44 is connected to a water source 46. The timer 42 is in the nature of a conventional sprinkler timer. The timer can be set to times when water will flow from the water source 46 through the second hose 44, through the first hose 40 and into the interior 48 of the container 12. The timer 42 can set the time of activation and the duration of activation. As such, if it is believed that is necessary to provide cool fresh water to a pet six times a day, then the timer can be set so as to allow water to flow six evenly spaced periods of time apart during the day. The timer can also be set so as to assure that water will flow for a desired period of time (such as three minutes). This will assure that the interior 48 of the container 12 is suitably filled with water such that the top level 50 of the water 52 in the interior 48 of container 12 reaches the outlet opening 16. Since water is continuously discharge through the outlet opening 16, the duration of water flow does not need to be accurately set. If the duration is over an extended period of time, the water will simply flow out of the outlet opening so that the container 12 is continuously filled with water.

As can be seen in FIG. 3, the water source 46 is in the nature of a faucet. An end of the second hose 44 is attached to the faucet 46 so that water flows, under pressure, through the second hose 44 and toward the timer 42. When the timer 42 is off, water is prevented from flowing into the first hose 40. When the timer 42 is on, the water will flow under pressure through the second hose 44, through the first hose 40 and into the inlet opening 14 of the container 12. Eventually, water will continue to flow until the level 50 of the water 52 reaches the outlet opening 16. At that time, water 52 will be discharged through the outlet opening 16.

Importantly, in the concept of the present invention, it is to be noted that debris within the interior 48 of container 12 will generally float in water. As such, debris and dirt will be at the top level 50 of the water 52. This dirt and debris can be discharged with the water through the outlet opening 16. As such, even though the animal may cause dirt and debris to enter the container 12, this debris is continually flushed. As such, the pet will be presented with clean end fresh water. The container 12 will remain generally dirt free.

In certain areas of the country, insect and mosquito larvae will be deposited by insects onto the surface of the water within the container 12. In the past, the animal would be consuming this larvae and can be possibly poisoned by the consumption of such larvae. In other circumstances, in conventional water containers and bowls, the larvae will eventually hatch into insects. The particular insects that may hatch from the larvae on the water will occupy a space adjacent to the container. As such, there is potential for stinging injuries to the pet or animal by virtue of the proximity of the insects. It has been found that certain mosquitoes can be potentially lethal to animals and pets. As such, it is important to avoid the accumulation of larvae and the associated hatched insects in proximity to the container. As such, by virtue of the continuous flushing provided by the present invention, any larvae that is deposited onto the surface of the water within the container will eventually flow through the outlet opening 16 and away from the container. Ultimately, if a drain hose is connected to the outlet opening, the potentially dangerous larvae can be delivered to a remote location for disposal.

The outlet opening 16 is located generally adjacent to the top 22 of container 12. The outlet opening 16 is shown as to located directly above the inlet opening 14. However, the outlet opening 16 can be located in a other location around the outer diameter of the container 12. The outlet opening 16 can be slightly greater than the inlet opening 14 so that dirt, debris, larvae and other objects that float on the surface of the water 52 can be discharged outwardly of the container 12. A drain hose 54 is connected to the outlet opening 16. Drain hose 54 can be extended to any drain location 56, such s a sewer system or drain field. If desired, the drain location 56 can be an area of the earth away from the container 12. In other circumstances, if desired, the drain location 56 can be a creek, a pond, or other body of water. In still other circumstances, if a sink is located near the container 12, the train hose 54 can be extended so that the discharged water from the interior of the container 12 will pass into the drain of the sink. The previous embodiments, it can be seen that the container was in the nature of a bucket. Importantly, within the present invention, the container can be of various other configurations.

FIG. 4 shows an embodiment in which the container is trough 70. This trough 70 can be in the nature of troughs that supply water to horses, pigs, sheep, goats and other farm animals. The trough 70 will have an interior 72 that can contain a relatively large amount of water. FIG. 4 shows that there is an inlet opening 74 positioned above and adjacent to the bottom 76 of the trough 70. A water hose 78 is connected to the inlet opening so as to supply fresh water into the interior of the trough 70. The outlet opening 80 is positioned below and adjacent to the top 82 of the trough 70. Outlet opening 80 has a hose fitting connected thereto so that water from the interior 72 will eventually flow outwardly from the trough 70 through the hose 84. As such, the present invention is adapted so as to allow farm animals to be supplied with clean, fresh and cold water which is relatively contaminant free.

In the present invention, the pet or other animal is continuously supplied with fresh water. As such, during hot temperatures, the animal will know that fresh, clean end cool water will be provided at the location of the container 12. The animal will not be discouraged from drinking the water because of the hot temperature of the water. Additionally, potential illness to the animal be avoided because of the uncleanliness of the water. The present invention utilizes the hydrostatic qualities of water so as to remove the dirt and debris from the container. The present invention avoids possible spillage because of the filling of the container after the container is placed in its desired location.

The foregoing disclosure and description of the invention is illustrative and explanatory thereof. Various changes in the details of the illustrated construction or the steps of the described method can be made within the scope of the appended claims without departing from the true spirit of the invention. The present invention should only be limited by the following claims and their legal equivalents.

I claim:

1. An animal water dispenser apparatus comprising:
   a container having an inlet opening and an outlet opening and a closed bottom, said inlet opening positioned below said outlet opening, said inlet opening directly and unobstructedly communicating with an interior of said container, said inlet opening having a nozzle, the nozzle having a reduced diameter opening at an end of the nozzle in the interior of said container, the reduced diameter opening of said nozzle adapted to direct fresh water under pressure toward a bottom of said container, the nozzle having a portion extending outwardly of an exterior of said container, said portion of the nozzle having a connection for a water hose at an end exterior of said container, said outlet opening having a portion extending outwardly of said container adjacent to and below a top of said container, said outlet opening adapted to allow water from the interior of said container to be released outwardly of said container when a level of water in said container rises to a level of said outlet opening.

2. The animal water dispenser apparatus of claim 1, further comprising:
   a water hose connected to said nozzle, said water hose adapted so as to pass fresh water into an interior of said container, said outlet opening adapted to allow water from the interior of said container to be released outwardly of said container.

3. The animal water dispenser apparatus of claim 2, further comprising:

a fresh water source connected to said water hose, said fresh water source adapted to pass the fresh water under pressure to said water hose and into said container.

4. The animal water dispenser apparatus of claim 3, further comprising:
   a sprinkler timer affixed to said water hose at a location away from said container, said timer cooperative with said hose so as to open or close said water hose in order to allow or prevent the passing of the fresh water therethrough to said inlet opening of said container.

5. The animal water dispenser apparatus of claim 1, said container being a bucket or a trough.

6. The animal water dispenser apparatus of claim 5, said container being a bucket, said bucket having a handle mounted to or adjacent to a top of said bucket, said handle movable between an extended position and a retracted position.

* * * * *